(12) United States Patent
Paczkowski et al.

(10) Patent No.: US 9,578,556 B2
(45) Date of Patent: Feb. 21, 2017

(54) LONG TERM EVOLUTION (LTE) COMMUNICATIONS OVER TRUSTED HARDWARE

(71) Applicant: Sprint Communications Company L.P., Overland Park, KS (US)

(72) Inventors: Lyle Walter Paczkowski, Mission Hills, KS (US); Arun Rajagopal, Leawood, KS (US); Ronald R. Marquardt, Woodinville, WA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/883,997

(22) Filed: Oct. 15, 2015

(65) Prior Publication Data

US 2016/0234725 A1    Aug. 11, 2016

Related U.S. Application Data

(63) Continuation of application No. 14/617,498, filed on Feb. 9, 2015, now Pat. No. 9,191,865.

(51) Int. Cl.
*H04W 12/00* (2009.01)
*H04W 36/00* (2009.01)
(Continued)

(52) U.S. Cl.
CPC ......... *H04W 36/0022* (2013.01); *H04L 67/14* (2013.01); *H04W 12/00* (2013.01);
(Continued)

(58) Field of Classification Search
CPC . H04W 36/0022; H04W 12/00; H04W 12/02; H04W 12/06; H04W 12/08;
(Continued)

(56) References Cited

U.S. PATENT DOCUMENTS 8,649,770 B1   2/2014   Cope et al.
8,667,607 B2   3/2014   Paczkowski et al.
(Continued)

FOREIGN PATENT DOCUMENTS

WO   2013183971   12/2013
WO   2014110453   7/2014
WO   2014125486   8/2014

OTHER PUBLICATIONS

"Challenge-response authentication;" Wikipedia, the free encyclopedia; Jun. 14, 2014; 4 pages; wikipedia.org.

*Primary Examiner* — Curtis A Alia

(57) ABSTRACT

A Long Term Evolution (LTE) communication network transfers data communications for User Equipment (UE). An LTE gateway system exchanges hardware trust data with a server system to maintain hardware trust for the LTE gateway system. An LTE access node processes a Radio Resource Control (RRC) message that contains a trusted bearer requirement for the UE to generate an S1 Application Protocol (S1-AP) initial UE message that contains the trusted bearer requirement for the UE. An LTE management node processes the S1-AP initial UE message to generate a General Packet Radio Service Transfer Protocol (GTP) create session message that contains the trusted bearer requirement for the UE. The LTE gateway system exchanges user data for the UE between the LTE access node and a communication node responsive to the GTP create session message.

20 Claims, 11 Drawing Sheets

(51) Int. Cl.
  *H04W 12/06* (2009.01)
  *H04W 12/08* (2009.01)
  *H04W 12/02* (2009.01)
  *H04W 76/02* (2009.01)
  *H04L 29/08* (2006.01)
  *H04W 88/16* (2009.01)

(52) U.S. Cl.
  CPC ........... *H04W 12/02* (2013.01); *H04W 12/06* (2013.01); *H04W 12/08* (2013.01); *H04W 36/0038* (2013.01); *H04W 76/02* (2013.01); *H04W 88/16* (2013.01)

(58) Field of Classification Search
  CPC . H04W 36/0038; H04W 76/02; H04W 88/16; H04L 67/14
  See application file for complete search history.

(56) References Cited

U.S. PATENT DOCUMENTS

| | | |
|---|---|---|
| 8,752,140 B1 | 6/2014 | Paczkowski et al. |
| 9,161,227 B1 | 10/2015 | Bye et al. |
| 2008/0080399 A1 | 4/2008 | Wang et al. |
| 2010/0235620 A1 | 9/2010 | Nylander et al. |
| 2011/0271320 A1 | 11/2011 | Andreasen |
| 2012/0023568 A1 | 1/2012 | Cha et al. |
| 2013/0104232 A1 | 4/2013 | Johnson et al. |
| 2013/0198811 A1 | 8/2013 | Yu et al. |
| 2013/0262844 A1 | 10/2013 | Hester |
| 2013/0345530 A1 | 12/2013 | McRoberts et al. |
| 2014/0013107 A1 | 1/2014 | Clair |
| 2014/0140227 A1 | 5/2014 | Gao et al. |
| 2014/0201374 A1 | 7/2014 | Ashwood-Smith et al. |
| 2014/0229945 A1 | 8/2014 | Barkai et al. |

LONG TERM EVOLUTION (LTE) COMMUNICATIONS OVER TRUSTED HARDWARE

RELATED CASES

This patent application is a continuation of U.S. patent application Ser. No. 14/617,498 that was filed on Feb. 9, 2015 and is entitled "Long Term Evolution Communications Over Trusted Hardware." U.S. patent application 14/617,498 is hereby incorporated by reference into this patent application.

TECHNICAL BACKGROUND

Data communication systems transfer data packets between user devices and machines to provide data communication services like internet access, media streaming, and user messaging. Wireless communication systems allow users to move about and communicate over the air with access communication networks. Wireless data networks provide mobile internet access, mobile media streaming, and mobile user messaging.

Long Term Evolution (LTE) is a popular wireless data technology. Using LTE, a wireless User Equipment (UE) detects an evolved-NodeB (eNodeB) base station and responsively exchanges Radio Resource Configuration (RRC) signaling with the eNodeB. The eNodeB then transfers an S1-Application Protocol (S1-AP) message to a Mobility Management Entity (MME), and the MME transfers a Diameter request message to a Home Subscriber System (HSS). These messages transport data for the UE like the International Mobile Subscriber Identifier (IMSI), Public Land Mobile Network (PLMN), Radio Access Technology (RAT) type, and serving network.

The HSS processes the IMSI, PLMN, RAT type, and serving network to select an Access Point Name (APN). The HSS transfers a Diameter response to the MME indicating the APN and associated APN information like a Packet Data Network Gateway (P-GW) Identifier (ID), Packet Data Network (PDN) type, default Quality-of-Service Class Identifier (QCI), and default Aggregate Maximum Bit Rate (AMBR).

The MME processes the Diameter response message to generate an S11 General Packet Radio Service Transfer Protocol (GTP) message. The S11 GTP message indicates the APN and P-GW ID among other data. The MME transfers the S11 GTP create session request to a Serving Gateway (S-GW). The S-GW processes the S11 GTP message to generate an S5 GTP message. The S5 GTP message also includes the APN and P-GW ID. The S-GW transfers the S5 GTP create session request to the P-GW.

The P-GW processes the APN and other data to identify an IP address for the UE. The P-GW processes the S5 GTP message to transfer a Diameter request to a Policy Charging Rules Function (PCRF). The Diameter request indicates the APN, default QCI, and default AMBR. The PCRF applies QoS and accounting rules for the UE based various data inputs. For example, the PCRF may change a QCI or AMBR for a UE based on its APN, IMSI, and PLMN. The PCRF transfers the Diameter response to the P-GW.

The P-GW processes the Diameter response to generate an S5 GTP response. The S5 GTP response indicates the UE IP address and any new QCIs or AMBRs. The P-GW transfers the S5 GTP response to the S-GW, and the S-GW transfers a corresponding S11 GTP response to the MME.

The MME processes the S11 GTP response to generate an S1-AP message that indicates the UE IP address, the GTP Tunnel Endpoint Identifiers (TEIDs) for the user and control planes, the QCI, AMBR, and the like. The MME transfers the S1-AP message to the eNodeB. The eNodeB processes the S1-AP message to transfer an RRC message to the UE that indicates the UE IP address, radio bearer, and Non-Access Stratum (NAS) information. The UE, eNodeB, and MME exchange additional messaging to set context before the MME transfers S11 modify bearer signaling to the S-GW, and the S-GW transfers S5 modify bearer signaling to the P-GW. The UE may then exchange user data over the eNodeB, S-GW, and P-GW.

Hardware trust systems ensure network security and control. The hardware trust systems maintain physical separation between trusted hardware and untrusted hardware. The trust systems control software access to the trusted hardware but allow interaction between open and secure software components through secure bus interfaces, memories, time slices, and switching circuits. The trust systems establish trust with one another by using secret keys embedded in their hardware to generate hash results for remote verification by other trust systems also knowing the secret keys and the hash algorithms. Unfortunately, the trust systems and the LTE systems are not effectively integrated.

TECHNICAL OVERVIEW

A Long Term Evolution (LTE) communication network transfers data communications for User Equipment (UE). An LTE gateway system exchanges hardware trust data with a server system to maintain hardware trust for the LTE gateway system. An LTE access node processes a Radio Resource Control (RRC) message that contains a trusted bearer requirement for the UE to generate an S1 Application Protocol (S1-AP) initial UE message that contains the trusted bearer requirement for the UE. An LTE management node processes the S1-AP initial UE message to generate a General Packet Radio Service Transfer Protocol (GTP) create session message that contains the trusted bearer requirement for the UE. The LTE gateway system exchanges user data for the UE between the LTE access node and a communication node responsive to the GTP create session message.

DETAILED DESCRIPTION

Figure 1:
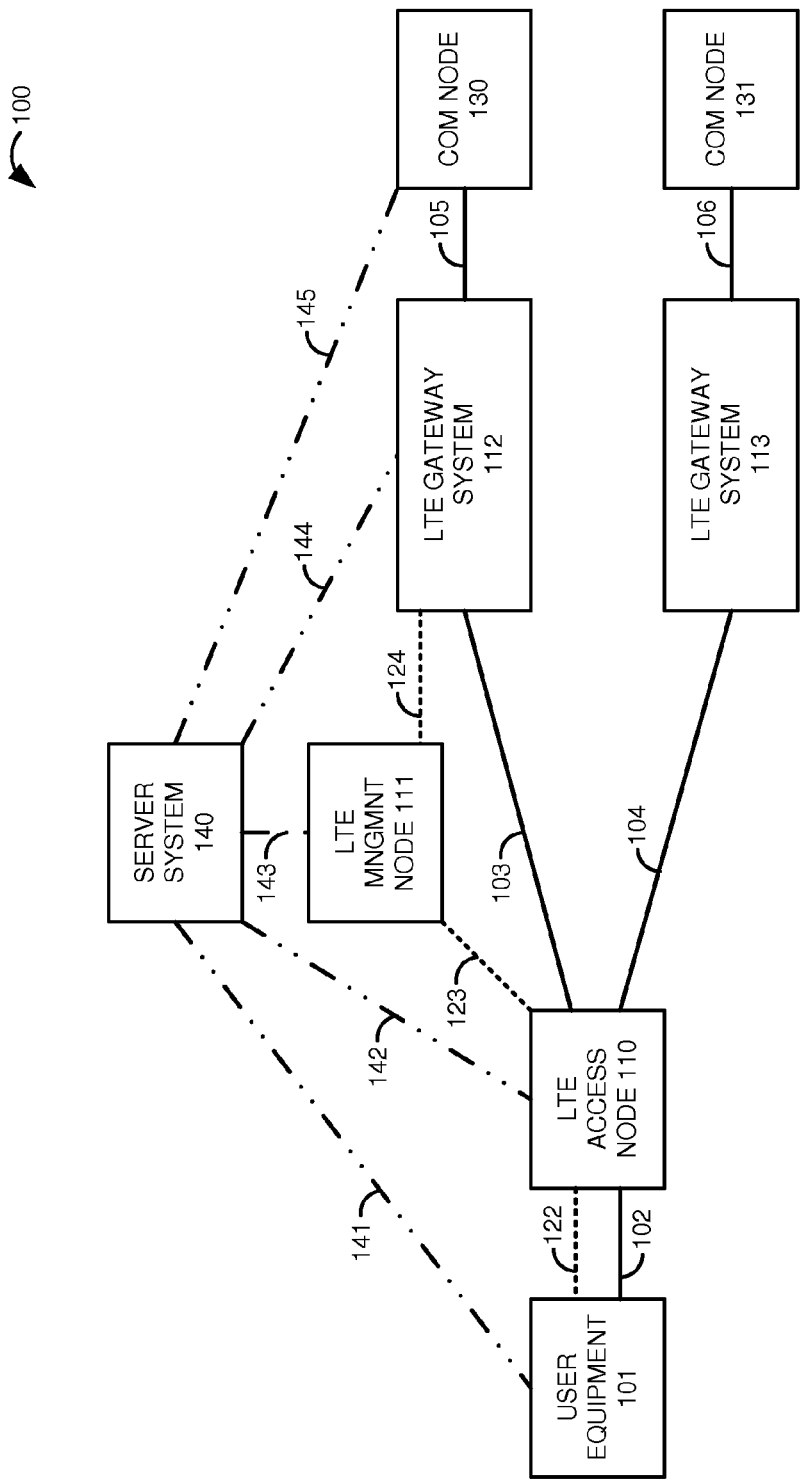
FIGS. 1-3 illustrate an LTE communication system to establish trusted bearers for UEs.
Figure 2:
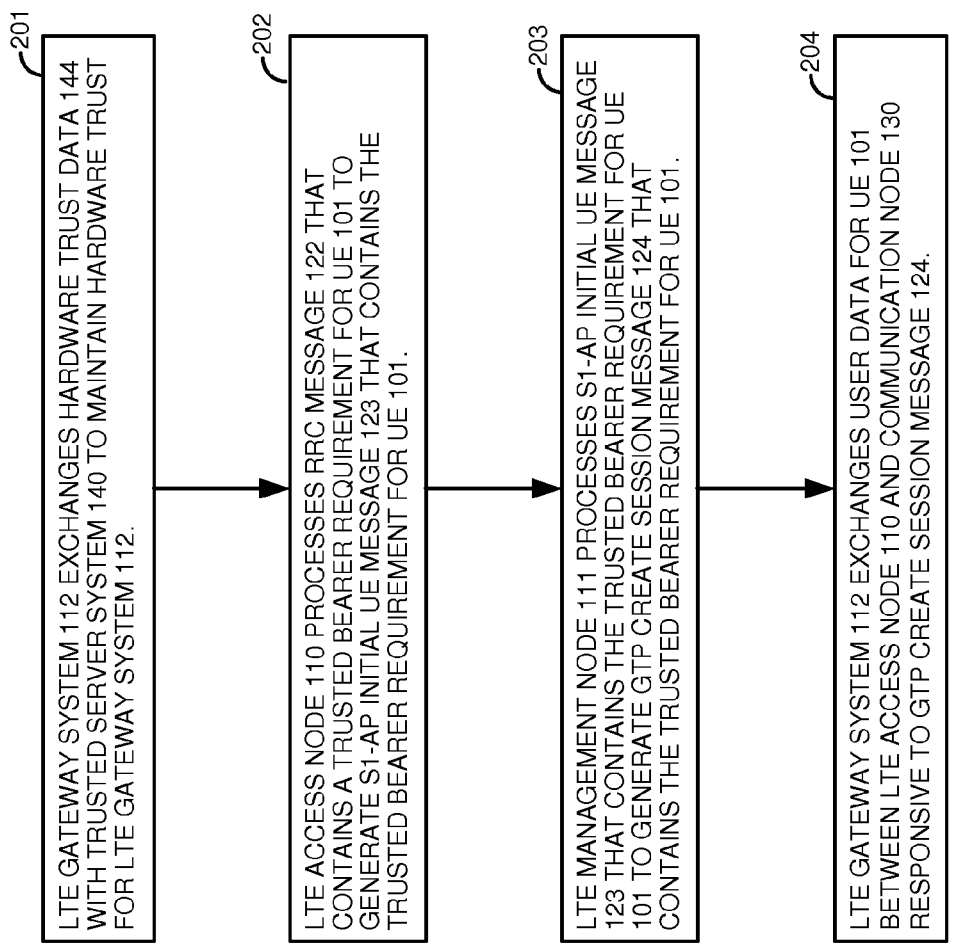
Figure 3:
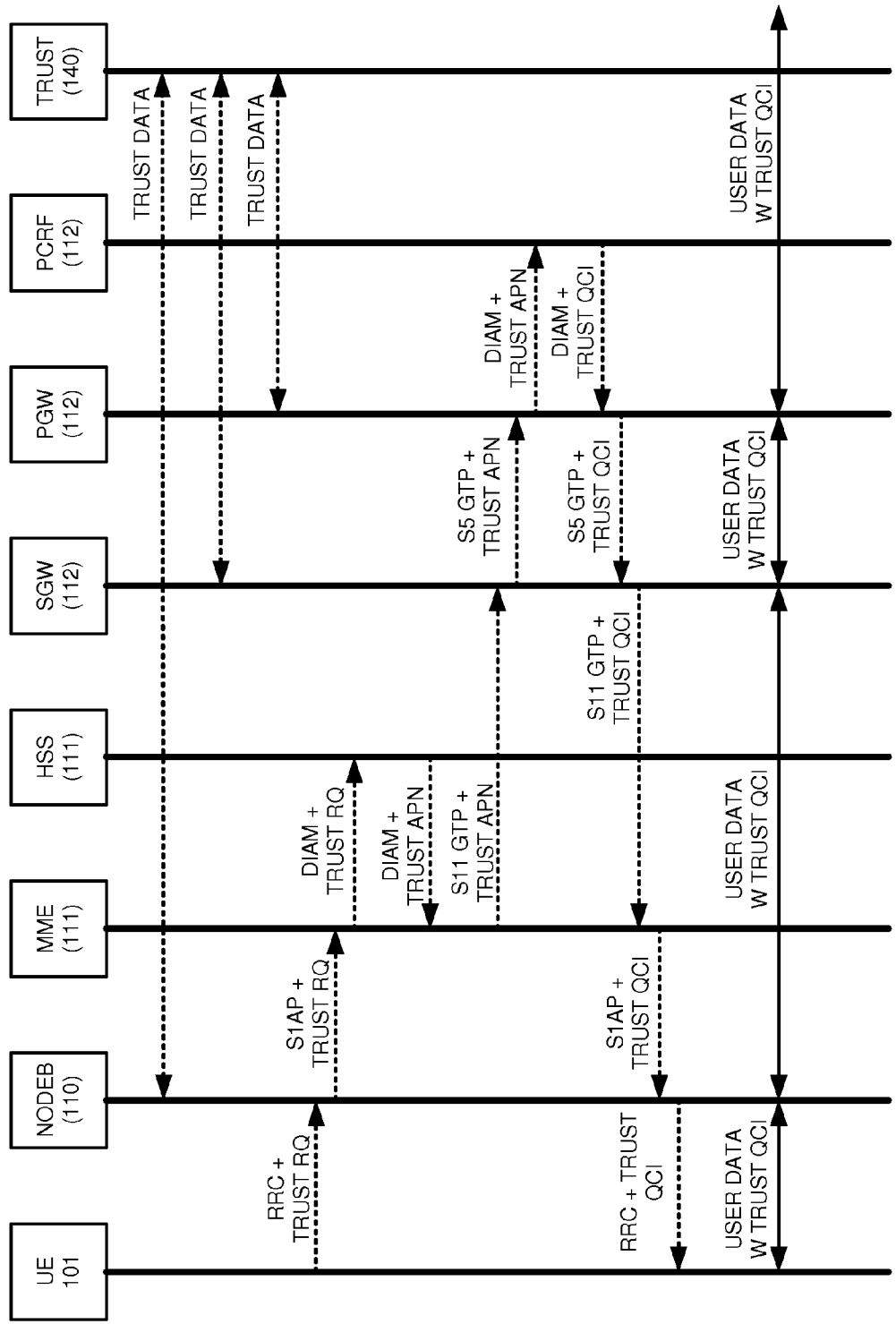

FIGS. 1-3 illustrate Long Term Evolution (LTE) communication system 100 to establish trusted bearers for User Equipment (UE) 101. LTE communication system 100 comprises UE 101, LTE access node 110, LTE management node 111, LTE gateway systems 112-113, communication nodes 130-131, and server system 140. UE 101 and LTE access node 110 communicate over Radio Resource Control (RRC) signaling link 122. LTE access node 110 and LTE management node 111 communicate over S1-AP signaling link 123. LTE management node 111 and LTE gateway systems 112-113 communicate over S11 General Packet Radio Service Transfer Protocol (GTP) signaling link 124.

UE 101 and LTE access node 110 also communicate over LTE bearer 102. LTE access node 110 and LTE gateway systems 112-113 communicate over respective LTE bearers 103-104. LTE gateway systems 112-113 and communication nodes 130-131 communicate over respective data links 105-106.

Server system 140 and UE 101 communicate over trust signaling link 141. Server system 140 and LTE access node 110 communicate over trust signaling link 142. Server system 140 and LTE management node 111 communicate over trust signaling link 143. Server system 140 and LTE gateway system 112 communicate over trust signaling link 144. Server system 140 and communication node 103 communicate over trust signaling link 145. Trust signaling links 141-145 may be transported by portions of signaling links 122-124 and bearers 102, 103, and 105. Note that server system 140 does not typically communicate with LTE gateway system 113 or with communication node 131.

UE 101 could be a phone, tablet computer, media device, or some other apparatus having a wireless LTE transceiver. UE 101 includes processing circuitry and memory that store and execute various software modules. UE 101 comprises communication transceivers, such as antennas, ports, bus interfaces, signal processors, memory, and software.

LTE access node 110 may be a wireless access node of various types such as an Enhanced Node B, picocell, femtocell, hotspot, repeater, and the like. LTE access node 110 includes components like an antenna, amplifier, modulator, computer, and communication ports. LTE access node 110 comprises processing circuitry and memory that store and execute various software modules, and LTE access node 110 may include virtual machines running on standard server systems.

LTE management node 111 may be a controller of various types like a Mobility Management Entity (MME), Home Subscriber System (HSS), and application server. LTE management node 111 includes a computer, bus interface, and communication ports that have processing circuitry and memory to store and execute various software modules. LTE management node 111 may comprise virtual machines running on standard server systems.

LTE gateway systems 112-113 may be packet gateways of various types like a Serving Gateway (S-GW), Packet Data Network Gateway (P-GW), High Speed Packet Access Gateway (HSPA-GW), High Rate Packet Data Gateway (HRPD-GW), Evolved Packet Data Gateway (ePDG), Multimedia Broadcast Multicast Service Gateway (M-GW), Broadcast Multicast Service Center (BM-SC), and/or some other type of data packet interface into an LTE system. LTE gateway systems 112-113 typically include Policy Charging and Rules Functions (PCRFs) and On-line Charging Systems (OCSs) as well. LTE gateway systems 112-113 include computers, bus interfaces, and communication ports that comprise processing circuitry and memory devices to store and execute various software modules. LTE gateway systems 112-113 may comprise virtual machines running on standard server systems.

Server system 140 establishes and maintains hardware trust with the hardware in LTE gateway system 112, and typically with the other hardware systems in UE 101, access node 110, and communication node 130. The hardware trust is first established within each hardware system that supports elements 101, 110, 112, and 130 by loading trust software modules to assert physical control over data access to hardware microprocessors, bus interfaces, memories, communication ports, and the like. The trust software modules read secret keys physically embedded in the hardware and transfer encoded versions of the secret keys to server system 140 to maintain hardware trust. For example, server system 140 might repeatedly transfer random numbers to gateway system 112, and system 112 would then perform a one-way hash on the random numbers with its secret key and return the hash results to server system 140. Server system 140 then compares the received hash results to its own self-generated hash results to verify the hardware trust of gateway system 112. Server system 140 includes a computer, bus interface, and communication ports that comprise processing circuitry and memory to store and execute various software modules. Server system 140 may include virtual machines running on standard server systems.

Communication nodes 130-131 comprise routers, switches, servers, databases, computers, user devices, or some other type of packet communication system.

In the following discussion, signaling messages are enumerated with the same reference numerals as the signaling links that they traverse. For example, an RRC message on RRC signaling link 122 is referred to as RRC message 122.

In operation, LTE gateway system 112 exchanges hardware trust data 144 with server system 140 to maintain hardware trust for LTE gateway system 112. Server system 140 may also exchange hardware trust data with UE 101, access node 110, and communication node 130, but server system 140 does not exchange hardware trust data with gateway system 113 or communication node 131.

UE 101 wirelessly synchronizes with LTE access node 110 during an initial RRC procedure over RRC link 122. UE 101 then transfers RRC message 122 to access node 110 that contains a trusted bearer requirement for UE 101. The trusted bearer requirement means that UE 101 should only communicate over hardware systems that are trusted by server system 140. The trusted bearer requirement may be indicated by an RRC Establishment Cause, Non-Access Stratum (NAS) information, or some other data field in RRC message 122.

LTE access node 110 processes RRC message 122 that contains the trusted bearer requirement for UE 101 to generate S1-AP initial UE message 123 that contains the trusted bearer requirement for UE 101. The trusted bearer requirement may be indicated by the Establishment Cause, NAS information, or some other data field in S1-AP message 123. LTE access node 110 transfers S1-AP initial UE message 123 that contains the trusted bearer requirement to LTE management node 111.

LTE management node 111 processing S1-AP initial UE message 123 to generate S11 GTP create session message 124 that contains the trusted bearer requirement for UE 101. The trusted bearer requirement may be indicated by Tunnel Endpoint Identifier (TEID) data, Access Point Name (APN) data, or some other data field in S11 GTP signaling 124.

UE 101 and LTE access node 110 wirelessly exchange user data over bearer 102. LTE access node 110 and LTE gateway system 112 exchange the user data over bearer 103. LTE gateway system 112 and communication node 130 exchange the user data over communication link 105 responsive to S11 GTP create session message 124.

In some examples, an MME in LTE management node 111 processes S1-AP initial UE message 123 to generate a Diameter message that contains the trusted bearer requirement for UE 101. An HSS in LTE management node 111 then processes the trusted bearer requirement in the Diameter message to generate a Diameter response that contains an Access Point Name (APN) for trusted LTE gateway system 112. If the trusted bearer requirement were not in the Diameter message, then the HSS could have selected a different APN for untrusted gateway system 113. The MME processes the Diameter response with the APN for trusted LTE gateway system 112 to generate S11 GTP create session message 124. Specifically, the MME processes the APN to identify a P-GW in LTE gateway system 112.

In some examples, an S-GW in LTE gateway system 112 processes S11 GTP create session message 124 having the trusted bearer requirement to generate an S5 GTP create session message that contains the trusted bearer requirement for UE 101. A P-GW in LTE gateway system 112 then processes the S5 GTP create session message to generate a Diameter message that contains the trusted bearer requirement. A PCRF in LTE gateway system 112 processes the Diameter message having the trusted bearer requirement for UE 101 to generate a Diameter response that contains additional requirements for the trusted bearer for UE 101. The P-GW processes the Diameter response to implement the trusted bearer for UE 101.

In some examples, LTE access node 110 exchanges hardware trust data with server system 140 to maintain hardware trust for a trusted hardware partition of LTE access node 110. LTE access node 110 exchanges the user data between UE 101 and LTE gateway system 112 through the trusted hardware partition of LTE access node 110 responsive to the trusted bearer requirement for UE 101 in RRC signaling 122 and/or S1-AP signaling 123.

Referring to FIG. 2, LTE gateway system 112 exchanges hardware trust data 124 with trusted server system 140 to maintain hardware trust for gateway system 112 (201). LTE access node 110 processes RRC message 122 that contains a trusted bearer requirement for UE 101 to generate S1-AP initial UE message 123 that contains the trusted bearer requirement for UE 101 (202). The trusted bearer requirement means that UE 101 should communicate over hardware systems that are trusted by server system 140. LTE management node 111 processes S1-AP initial UE message 123 that contains the trusted bearer requirement for UE 101 to generate S11 GTP create session message 124 that contains the trusted bearer requirement for UE 101 (203). LTE gateway system 112 exchanges user data for UE 101 between LTE access node 110 and communication node 130 responsive to S11 GTP create session message 124 (204). Note that additional LTE messaging takes place in a supporting and contemporaneous manner to that above in order to implement this LTE bearer, but this supporting signaling has been omitted from the discussion for clarity to teach innovative aspects.

Referring to FIG. 3, an exemplary configuration and operation for LTE communication system 100 is described, although system features may vary in other examples. Various network elements are shown on FIG. 3 with their home system indicated in parentheses. For example, an MME is shown with a parenthetical notation for LTE management node 111, and a P-GW is shown with a parenthetical notation for LTE gateway system 112. For clarity, these networks elements are enumerated below using the reference numerals of their home systems, so the MME is referred as MME 111, and the P-GW is referred to as P-GW 112.

Trust server 140 exchanges hardware trust data with NodeB 110 to establish and maintain remote hardware trust for trusted NodeB 110. Trust server 140 exchanges hardware trust data with S-GW 112 to establish and maintain remote hardware trust for trusted S-GW 112. Trust server 140 exchanges hardware trust data with P-GW 112 to establish and maintain remote hardware trust for trusted P-GW 112.

Although not shown on FIG. 3, trust server 140 may also exchange hardware trust data with UE 101 to establish and maintain hardware trust for UE 101. The hardware trust verification for UE 101 may be periodic or be performed in response to UE rules in HSS 111 or in PCRF 112.

UE 101 transfers an RRC message to NodeB 110 that contains a trusted bearer requirement for UE 101. The trusted bearer requirement means that UE 101 should only communicate over hardware systems that are trusted by trust server 140. The trusted bearer requirement may be indicated by an RRC Establishment Cause, NAS information, or some data other field in the RRC signaling. NodeB 110 processes the RRC message with the trusted bearer requirement to generate an S1-AP initial UE message that contains the trusted bearer requirement for UE 101. NodeB 110 transfers the S1-AP initial UE message to MME 111.

MME 111 processes the S1-AP initial UE message to generate a Diameter message that contains the trusted bearer requirement for UE 101. The MME transfers the Diameter message to HSS 111. HSS 111 processes the trusted bearer requirement for UE 101 from the Diameter message to identify a trusted APN for trusted P-GW 112. HSS 111 sends a Diameter response to MME 111 having the trusted APN.

MME 111 processes the Diameter response with the trusted APN for trusted P-GW 112 to generate an S11 GTP create session message. MME 111 transfers the S11 GTP create session message with the trusted APN to trusted S-GW 112. Trusted S-GW 112 processes the S11 GTP create session message having the trusted APN to generate an S5 GTP create session message that contains the trusted APN for UE 101. S-GW 112 transfers the S5 GTP create session message to trusted P-GW 112.

Trusted P-GW 112 processes the S5 GTP create session message to generate a Diameter message that contains the trusted APN. P-GW 112 transfers the Diameter message with the trusted APN to PCRF 112. PCRF 112 processes the Diameter message having the trusted APN for UE 101 to identify a Quality-of-Service (QoS) Class Indicator for a trusted bearer for UE 101. PCRF 112 transfers a Diameter response that contains the trust QCI—and possibly additional trust requirements for the trusted bearer. For example, PCRF 112 may process the APN and a UE ID to add a requirement that trust server 140 perform a hardware trust verification on UE 101 during the data session.

P-GW 112 processes the Diameter response to generate and transfer an S5 GTP create session response with the trust QCI to S-GW 112. S-GW 112 processes the S5 GTP create session response to generate and transfer an S11 GTP create session response with the trust QCI to MME 111. MME 111 processes the S11 GTP create session response to generate and transfer an S1-AP initial context set-up request with the trust QCI to NodeB 110. NodeB 110 processes the S1-AP initial context set-up request to generate and transfer an RRC connection reconfiguration message with the trust QCI to UE 101.

In response to the above messaging, UE 101 and trusted NodeB 110 wirelessly exchange user data over trusted bearer 102 based on the trust QCI. Trusted NodeB 110 and trusted S-GW 112 exchange the user data over trusted bearer 103 based on the trust QCI. Trusted S-GW 112 and trusted P-GW 112 exchange the user data over a trusted bearer based on the trust QCI. Trusted P-GW 112 exchanges the user data with communication node 130 over trusted data link 105 based on the trust QCI.

As stated above, additional LTE messaging takes place in a supporting and contemporaneous manner to that above in order to implement this LTE bearer. This supporting signaling has been omitted from the discussion for clarity to teach innovative aspects.

Figure 4:
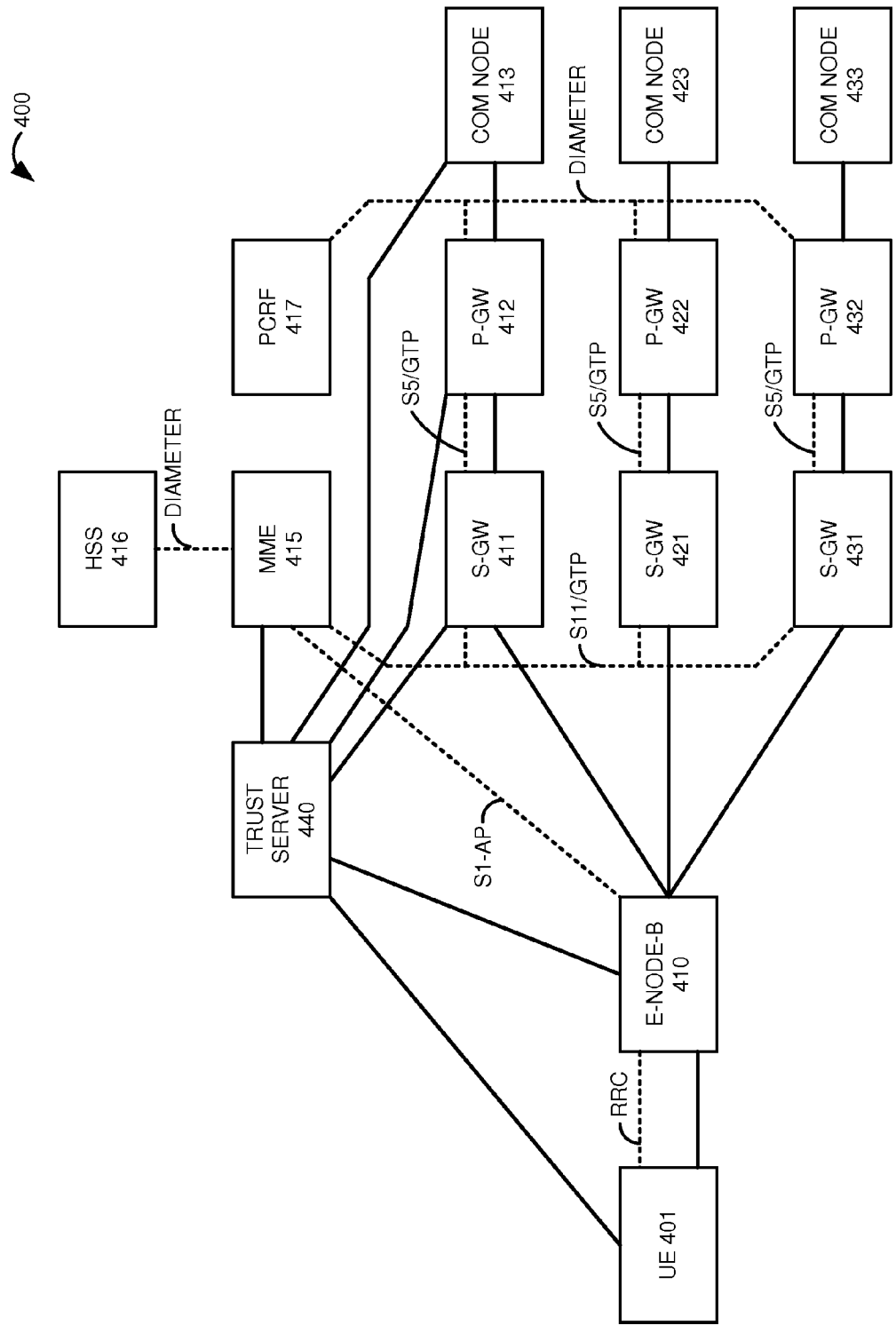
FIGS. 4-5 illustrate LTE networks to establish trusted bearers for UEs.

FIG. 4 illustrates LTE communication network 400 to establish a trusted bearer for UE 401. LTE communication network 400 is an example of communication system 100, although system 100 may use alternative configurations and operations. LTE communication network 400 comprises UE 401, eNodeB 410, S-GW 411, P-GW 412, communication node 413, MME 415, HSS 416, PCRF 417, S-GW 421, P-GW 422, communication node 423, S-GW 431, P-GW 432, communication node 433, and trust server 440.

Trust server 440 establishes and maintains hardware trust with UE 401, eNodeB 410, S-GW 411, P-GW 412, and communications node 413. The hardware trust is first established within each hardware system that operates network elements 401, 410, 411, 412, 413, 440 by loading trust software modules to assert physical control over data access to hardware microprocessors, bus interfaces, memories, communication ports, and the like. The trust software modules read secret keys physically embedded in the hardware and transfer encoded versions of the secret keys to maintain hardware trust. In this example, trust server 440 repeatedly transfers random numbers to UE 401, eNodeB 410, S-GW 411, P-GW 412, and communications node 413, and these systems hash the random numbers with their secret keys to return hash results to trust server 440. Trust server 440 then compares the received hash results to self-generated hash results to establish or verify the hardware trust.

Through a power-up, movement, or hand-over, UE 401 detects eNodeB 410 and responsively exchanges LTE RRC signaling with eNodeB 410. The RRC signaling exchange includes a trusted bearer requirement from UE 401. The trusted bearer requirement may be triggered in UE 401 by a mode switch, application, location, time, and the like. The trusted bearer requirement may be included in the Establishment Cause, NAS information, and/or some other portion of the RRC signaling. If the RRC signaling indicates a trusted bearer requirement for UE 401, then eNodeB 410 allocates trusted hardware to exchange resource blocks with UE 401. In some cases, only trusted hardware is available in eNodeB 410.

eNodeB 410 transfers an S1-AP message to MME 415 that indicates the trusted bearer requirement for UE 401 in response to the trusted bearer requirement in the RRC signaling. MME 415 transfers a Diameter request message to HSS 416 that indicates the trusted bearer requirement for UE 401 responsive to the trusted bearer requirement in the S1-AP message. HSS 416 processes the Diameter request message to generate a Diameter response message. Specifically, HSS 416 processes the trusted bearer requirement to select a trusted APN that uses trusted hardware. Typically, HSS 416 also processes the IMSI, PLMN, RAT type, and serving network to further refine the trusted APN selection. In this example, HSS 416 selects an APN that uses trusted gateways 411-412 and communication node 413 in response to the trusted bearer requirement. HSS 416 transfers the Diameter response message to MME 415. The Diameter response message indicates the trusted APN and associated APN information like a trusted P-GW ID, PDN type, default QCI, and default AMBR data.

MME 415 processes the Diameter response message to generate an S11 GTP message. The S11 GTP message indicates the trusted APN and trusted P-GW ID among other data. MME 415 transfers the S11 GTP create session request to S-GW 411. S-GW 411 processes the S11 GTP message to generate an S5 GTP message. The S5 GTP message also includes trusted APN and trusted P-GW ID. S-GW 411 transfers the S5 GTP create session request to P-GW 412.

P-GW 412 processes the trusted APN and other data to identify an IP address for UE 401. P-GW 412 processes the S5 GTP message to transfer a Diameter request to PCRF 417. The Diameter request indicates the trusted APN, default QCI, and default AMBR. PCRF 417 processes the Diameter request to generate a Diameter response. In particular, PCRF 417 applies QoS and accounting rules for UE 401 based various data inputs including the trusted bearer requirement. For example, PCRF 417 may process the trusted APN and serving network ID to select a new QCI for the trusted bearer for UE 401. PCRF 417 may also apply trust policies, such as on-demand UE and/or gateway hardware verification and the like. PCRF 417 transfers the Diameter response to P-GW 412.

P-GW 412 processes the Diameter response to generate an S5 GTP response. The S5 GTP response indicates the UE IP address and any new QCIs, AMBRs, and trust requirements. P-GW 412 transfers the S5 GTP response to S-GW 411. S-GW 411 processes the S5 GTP response to generate an S11 GTP response. The S11 GTP response indicates the UE IP address and any new QCIs, AMBRs, and trust requirements. S-GW 411 transfers the S11 GTP response to MME 415.

MME 415 processes the S11 GTP response to generate an S1-AP message. The S1-AP message indicates the UE IP address, the GTP TEIDs for the user and control planes, the QCI, AMBR, and the like. MME 415 transfers the S1-AP message to eNodeB 410. eNodeB 410 processes the S1-AP message to generate an RRC message that indicates the UE IP address, radio bearer, and NAS information. eNodeB 410 transfers the RRC message to UE 401. UE 401, eNodeB 410, and MME 415 exchange additional messaging to set context before MME 415 transfers S11 modify bearer signaling to S-GW 411, and S-GW 411 transfers S5 modify bearer signaling to P-GW 412. UE 401 and communication node 413 then exchange user data over eNodeB 410, S-GW 411, and P-GW 412—all using trusted hardware.

Trust server 440 does not establish hardware trust with S-GW 421, P-GW 422, and communications node 423. In another example, UE 401 detects eNodeB 410 and responsively exchanges LTE RRC signaling with eNodeB 410. This RRC signaling exchange does not include the trusted bearer requirement for UE 401. The lack of the trusted bearer requirement may be due to a mode switch, location, application, time, or the like. If the RRC signaling does not indicate the trusted bearer requirement, then eNodeB 410 does not need to allocate trusted hardware for UE 401, although only trusted hardware may be available. In addition, the resulting S1-AP message to MME 415 does not include the trusted bearer requirement, so a trusted APN is not required. Thus, HSS 416 may select an APN that uses untrusted hardware in S-GW 421, P-GW 422, and communications node 423.

Figure 5:
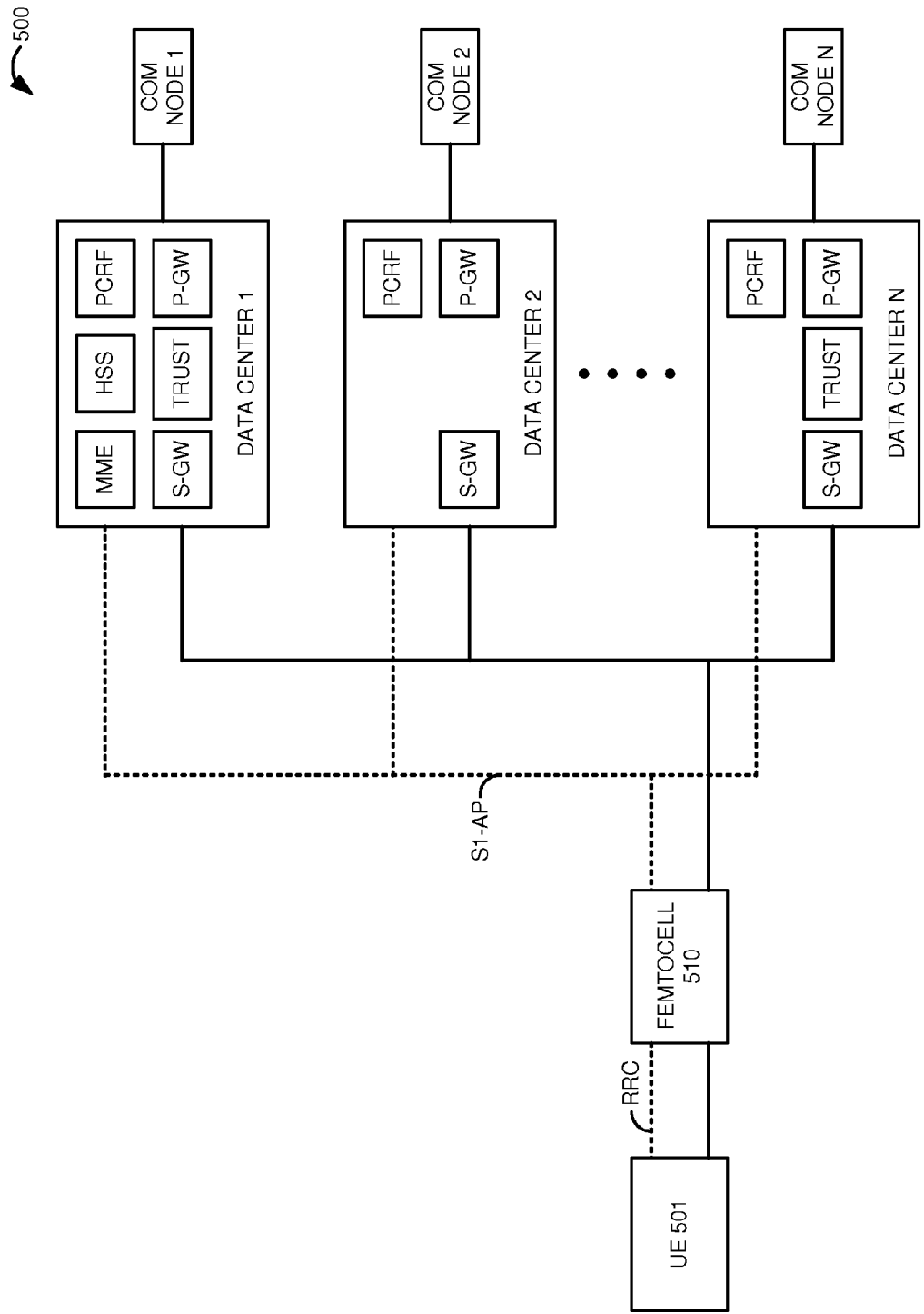
Figure 6:
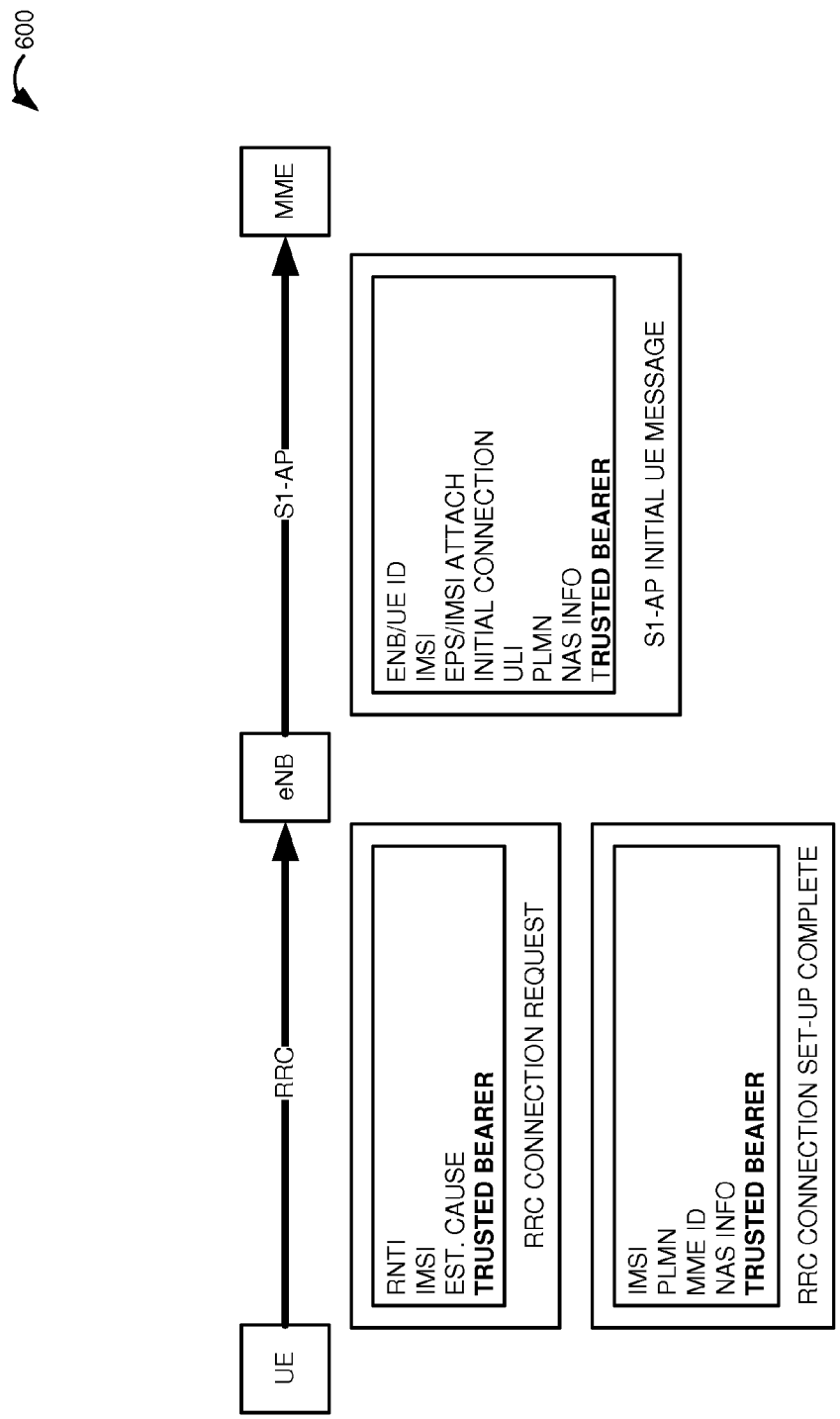
FIGS. 6-11 illustrate LTE and Diameter signaling to establish trusted bearers for UEs.

FIG. 5 illustrates LTE communication network 500 to establish a trusted bearer for UE 501. LTE communication network 500 is an example of communication system 100 and network 400, although system 100 and network 400 may use alternative configurations and operations. LTE communication network 500 comprises UE 501, femtocell 510, data centers 1-N, and communication nodes 1-N. Data centers 1-N each host various virtual machine network elements including S-GW, P-GW, MME, HSS, PCRF, and the like. Data centers 1 and N include trust systems to verify hardware trust. Data center 2 does not have a trust system. The trust systems maintain hardware trust at data centers 1 and N through the exchange of challenge data using shared secret keys.

UE 501 detects femtocell 510 and responsively exchanges LTE RRC signaling with femtocell 510. The RRC signaling exchange includes a trusted bearer requirement from UE 501. The trusted bearer requirement may be triggered in UE 501 by a mode switch, application, location, time, and the like. The trusted bearer requirement may be included in the Establishment Cause, NAS information, and/or some other portion of the RRC signaling. If the RRC signaling indicates a trusted bearer requirement for UE 501, then femtocell 510 allocates trusted hardware to exchange the resource blocks with UE 501, although only trusted hardware may be available in femtocell 510.

Femtocell 510 transfers an S1-AP message to an MME in data center #1 that indicates the trusted bearer requirement for UE 501 in response to the trusted bearer requirement in the RRC signaling. The MME transfers a Diameter request to the HSS. The HSS selects a trusted APN that uses trusted hardware responsive to the trusted bearer requirement. In this example, the HSS selects an APN that uses trusted data center #1 and trusted communication node #1. The HSS transfers a Diameter response to the MME. The Diameter response indicates the trusted APN and associated APN information like a trusted P-GW ID, PDN type, default QCI, and default AMBR data.

The MME generates an S11 GTP message that indicates the trusted APN and trusted P-GW ID among other data. The MME transfers the S11 GTP create session request to the S-GW, and the S-GW transfers a corresponding S5 GTP message to the P-GW. The P-GW identifies an IP address for UE 501. The P-GW processes transfers a Diameter request to the PCRF indicating the trusted APN, trusted P-GW ID, default QCI, and default AMBR. The PCRF applies QoS and accounting rules for UE 501 based the trusted bearer requirement. For example, the PCRF may process the trusted APN to select a new AMBR for the trusted bearer. The PCRF may also apply trust policies, such as on-demand hardware verification for UE 501 and communication node #1. The PCRF transfers a Diameter response to the P-GW.

The P-GW generates an S5 GTP response that indicates the UE IP address and any new QCIs, AMBRs, and trust requirements. The P-GW transfers the S5 GTP response to the S-GW, and the S-GW transfers a corresponding S11 GTP response to the MME. The MME transfers an S1-AP message to femtocell 510 that indicates the GTP TEID, QCI, AMBR, and the like. Femtocell 510 transfers an RRC message to UE 501 that indicates the UE IP, radio bearer, and NAS information. UE 501 and communication node #1 then exchange user data over femtocell 510 and data center #1 using trusted hardware.

Subsequently, UE 501 detects femtocell 510 and responsively exchanges LTE RRC signaling with eNodeB 410. In this case, the RRC signaling does not include the trusted bearer requirement for UE 501. Femtocell 510 need not use trusted hardware for UE 501, although only trusted hardware may be available. In addition, the resulting S1-AP message to the MME does not include the trusted bearer requirement, so a trusted APN is not required. Femtocell 510 may use the MME in Data Center #2. The HSS may select an APN that uses untrusted hardware in data center #2. UE 501 and communication node #2 would then exchange user data over data center #2 using untrusted hardware.

FIGS. 6-10 illustrate LTE signaling 600 to establish trusted bearers for a UE. LTE signaling 600 is an example of the signaling used by system 100 and networks 400 and 500, although they may use alternative configurations and operations. Note that some signaling data and supporting signaling messages are omitted from the following discussion for clarity to teach innovative aspects.

In operation, an LTE UE detects wireless signaling from an eNodeB and begins an LTE RRC data exchange with the eNodeB. These initial random access RRC messages that set timing and establish a UE ID are not shown. The UE transfers an RRC connection request message to the eNodeB. The RRC connection request message includes UE Identifiers (IDs) like the Radio Network Temporary Identifier (RNTI) and International Mobile Subscriber Entity (IMSI). The RRC connection request message includes an Establishment Cause like Mobile-Originated Signaling (MO-SIG) or Mobile-Originated Data (MO-DATA). The RRC connection request message also includes a trusted bearer requirement for the UE. In some examples, the trusted bearer requirement is indicated by the Establishment Cause itself. In other examples, the trusted bearer requirement is transferred in other RRC signaling and is not provided in the RRC connection request message.

The eNodeB processes the Establishment Cause in the RRC connection set-up message to select resource blocks for the UE. If the Establishment Cause indicates the trusted bearer requirement for the UE, then the eNodeB allocates trusted hardware to exchange the resource blocks with the UE. Although not shown for clarity, the eNodeB returns an RRC connection set-up message with the pertinent LTE resource block information.

The UE transfers an RRC connection set-up complete message to the eNodeB. The RRC connection set-up complete message includes UE IDs like the IMSI. The RRC connection set-up complete message includes a Public Land Mobile Network (PLMN) ID, MME ID, and NAS information. The RRC connection set-up complete message also includes the trusted bearer requirement for the UE. In some examples, the trusted bearer requirement is indicated by the NAS information. In other examples, the trusted bearer requirement is transferred in other RRC signaling and is not provided in the RRC connection set-up complete message.

The eNodeB processes the RRC connection set-up complete message to generate an S1-AP message. The S1-AP message includes an eNodeB/UE ID and IMSI. The S1-AP message indicates an Evolved Packet System (EPS)/IMSI attachment for an initial connection. The S1-AP message includes User Location Information (ULI) like tracking area, cell ID, sector ID, and the like. The S1-AP message includes the PLMN and NAS info. The S1-AP message includes the trusted bearer requirement for the UE—possibly in the NAS information. The trusted bearer requirement for the UE in the S1-AP message is included in response to the trusted bearer requirement in the RRC messaging. The eNodeB transfers the S1-AP message to the MME. Thus, the eNodeB is able to implement trusted hardware for a UE on an individual attachment basis.

Figure 7:
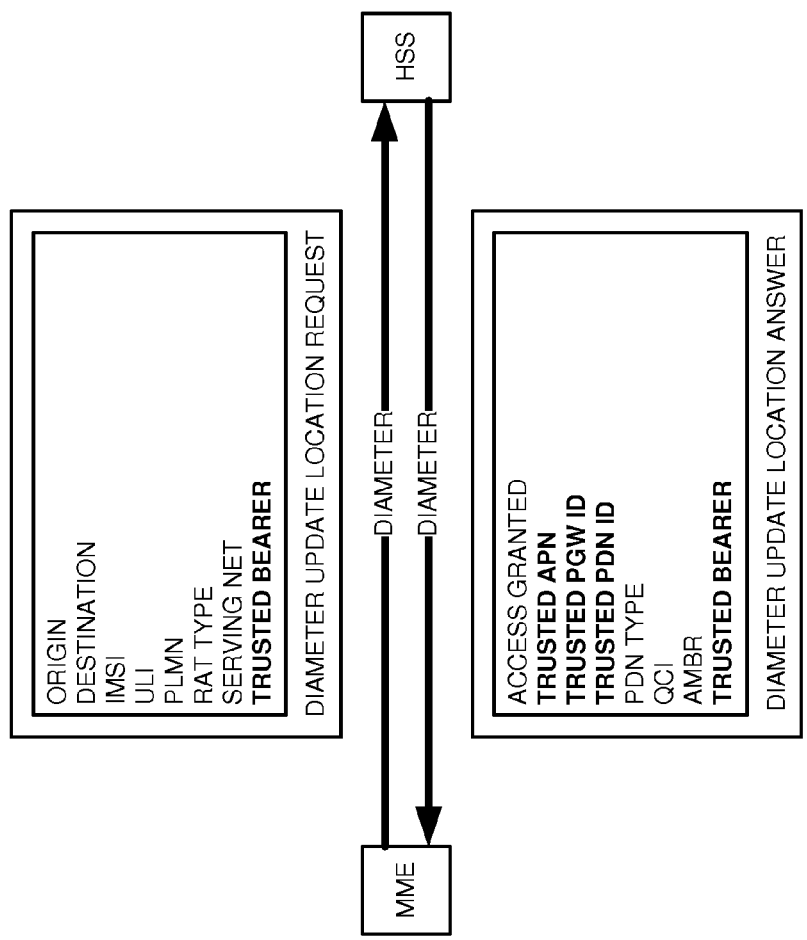

Referring to FIG. 7, the MME transfers a Diameter Update Location Request message to the HSS. The Diameter Update Location Request message indicates host/realm for the origin and destination. The Diameter Update Location Request message indicates the IMSI, ULI, PLMN, RAT type, and the serving network. The Diameter Update Location Request message indicates the trusted bearer requirement for the UE responsive to the trusted bearer requirement in the S1-AP message.

The HSS processes the Diameter Update Location Request message to generate a Diameter Update Location Response message. The HSS processes the trusted bearer requirement from the request to select a trusted APN that uses trusted hardware systems. Typically, the IMSI, PLMN, RAT type, and the serving network are used to further refine trusted APN selection. For example, different combinations of IMSIs, PLMNs, and serving networks may yield different trusted APNs. Thus, the HSS is able to select trusted APNs and hardware for the UE on an individual attachment basis.

The HSS transfers the Diameter Update Location Response message to the MME. The Diameter Update Location Response message indicates that network access is granted to the UE. The Diameter Update Location Response message indicates the trusted APN and associated APN information like a trusted P-GW ID, trusted PDN ID, PDN type, QCI, AMBR data, and the trusted bearer requirement. The trusted bearer requirement may be indicated through the trusted APN, P-GW ID, and PDN ID.

Figure 8:
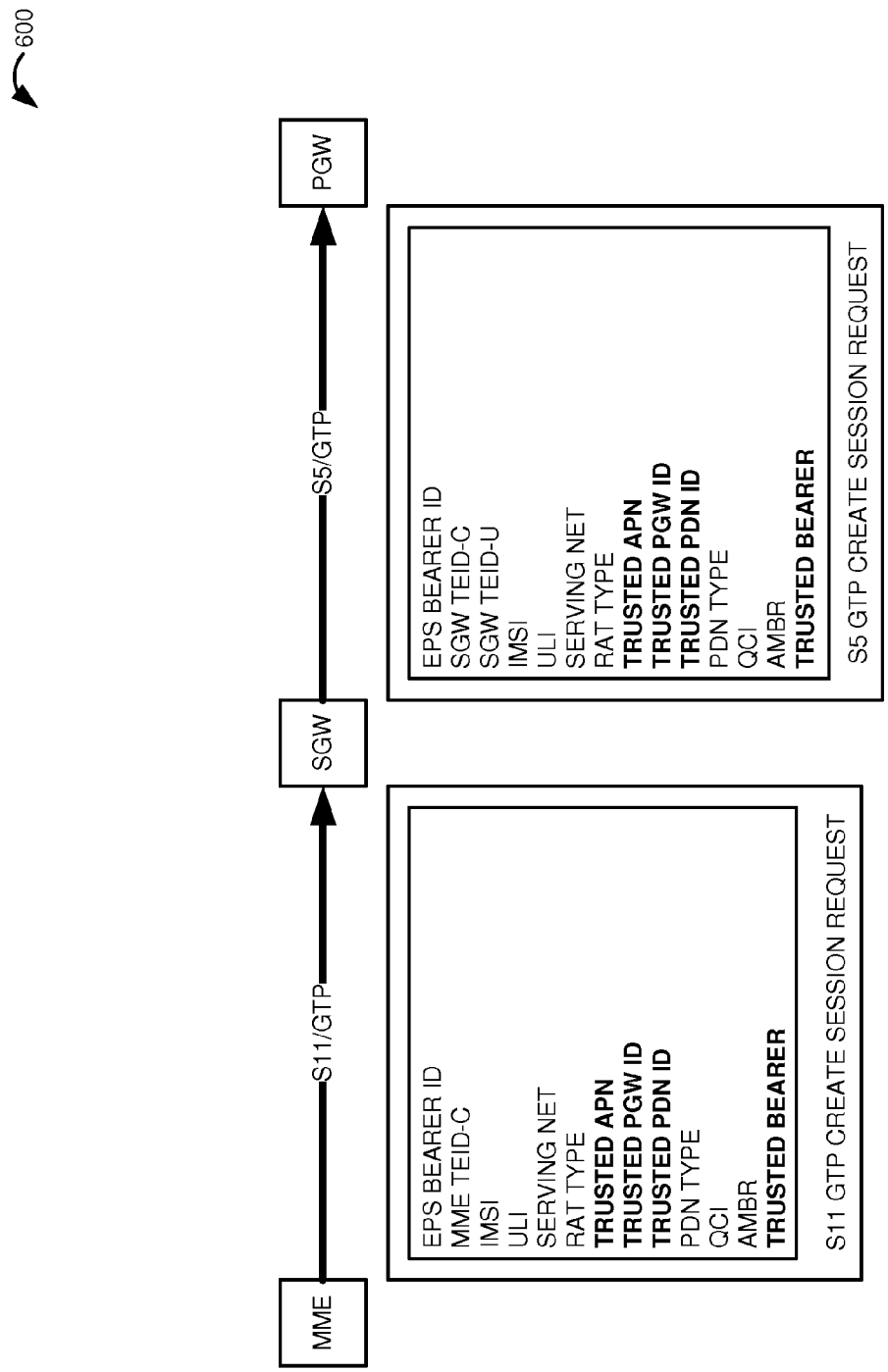

Referring to FIG. 8, the MME processes the Diameter Update Location Response message to generate an S11 GTP create session request. The S11 GTP create session request includes an Evolved Packet System (EPS) bearer ID and a GTP TEID for the MME control plane (MME TEID-C). The S11 GTP create session request identifies the IMSI, ULI, serving network, RAT type, trusted APN, trusted P-GW ID, trusted PDN ID, PDN type, QCI, and AMBR. The S11 GTP create session request also includes the trusted bearer requirement, although this requirement may be indicated through the trusted APN, P-GW ID, and PDN ID. The MME transfers the S11 GTP create session request to the S-GW.

The S-GW processes the S11 GTP create session request to generate an S5 GTP create session request. The S5 GTP create session request includes the EPS bearer ID and GTP TEIDs for the S-GW control and user planes (S-GW TEID-C and S-GW TEID-U). The S5 GTP create session request identifies the IMSI, ULI, serving network, RAT type, trusted APN, trusted P-GW ID, trusted PDN ID, PDN type, QCI, and AMBR. The S5 GTP create session request also includes the trusted bearer requirement, although this requirement may be indicated through the trusted APN, P-GW ID, and PDN ID. The S-GW transfers the S5 GTP create session request to the P-GW.

Figure 9:
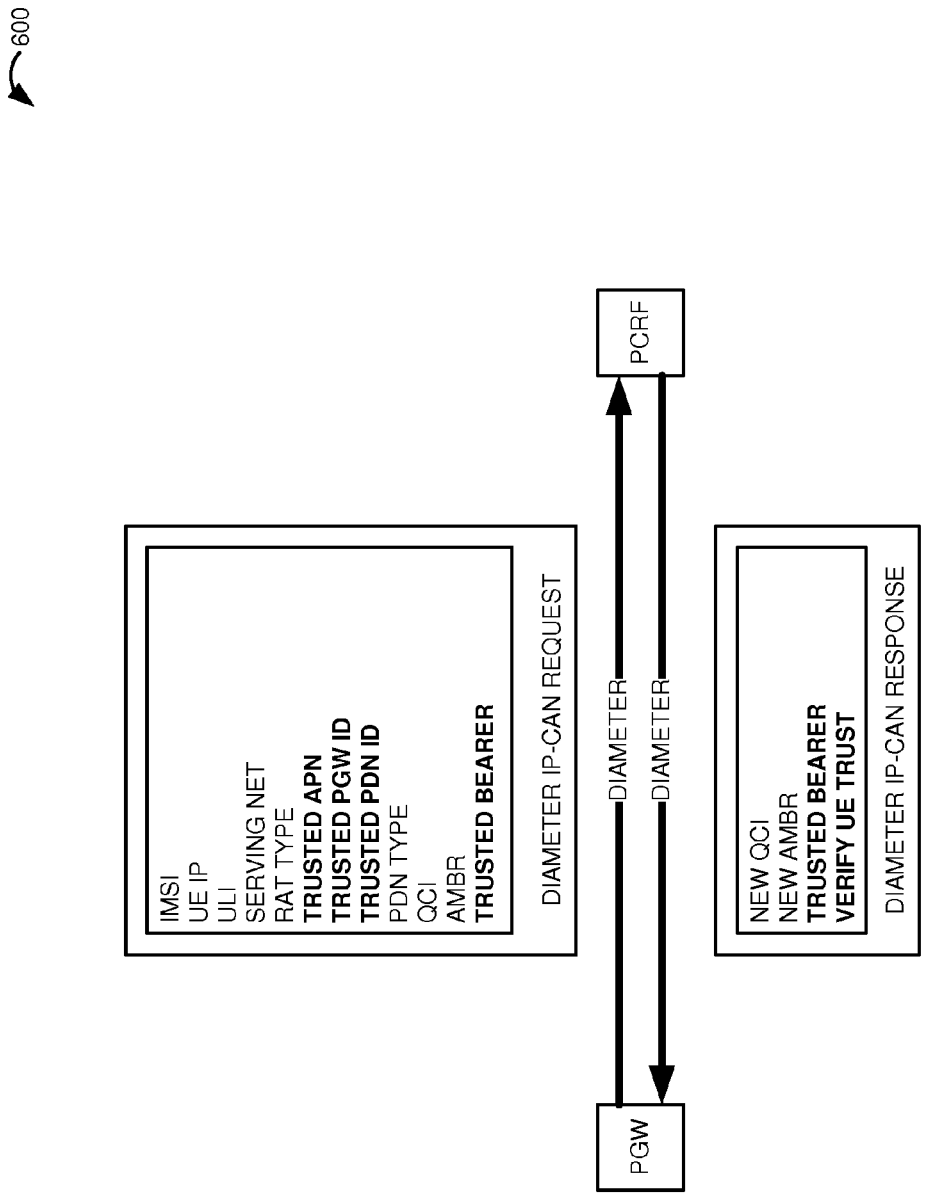

Referring to FIG. 9, the P-GW processes the trusted APN and other data to identify an IP address for the UE. The P-GW processes the S5 GTP create session request to transfer a Diameter Internet Protocol Connectivity Access Network (IP-CAN) request to the PCRF. The Diameter IP-CAN request indicates the IMSI, UE IP, ULI, serving network, RAT type, trusted APN, trusted P-GW ID, trusted PDN ID, PDN type, QCI, and AMBR. The Diameter IP-CAN request also includes the trusted bearer requirement, although this requirement may be indicated through the trusted APN, P-GW ID, and PDN ID.

The PCRF processes the Diameter IP-CAN request to generate a Diameter IP-CAN response. In particular, the PCRF identifies QoS and accounting rules based various data including the trusted bearer requirement. In this example, the PCRF processes the trusted APN, IMSI, and ULI to select a new QCI and AMBR for the trusted bearer. The PCRF also processes the trusted APN and serving network to select order a hardware trust verification for the UE. Thus, the PCRF is able to implement trust policies on an individual trusted bearer basis. The Diameter IP-CAN response indicates the new QCI, new AMBR, trusted bearer requirement, and the new requirement to verify hardware trust on the UE. The PCRF transfers the Diameter IP-CAN response to the P-GW.

Figure 10:
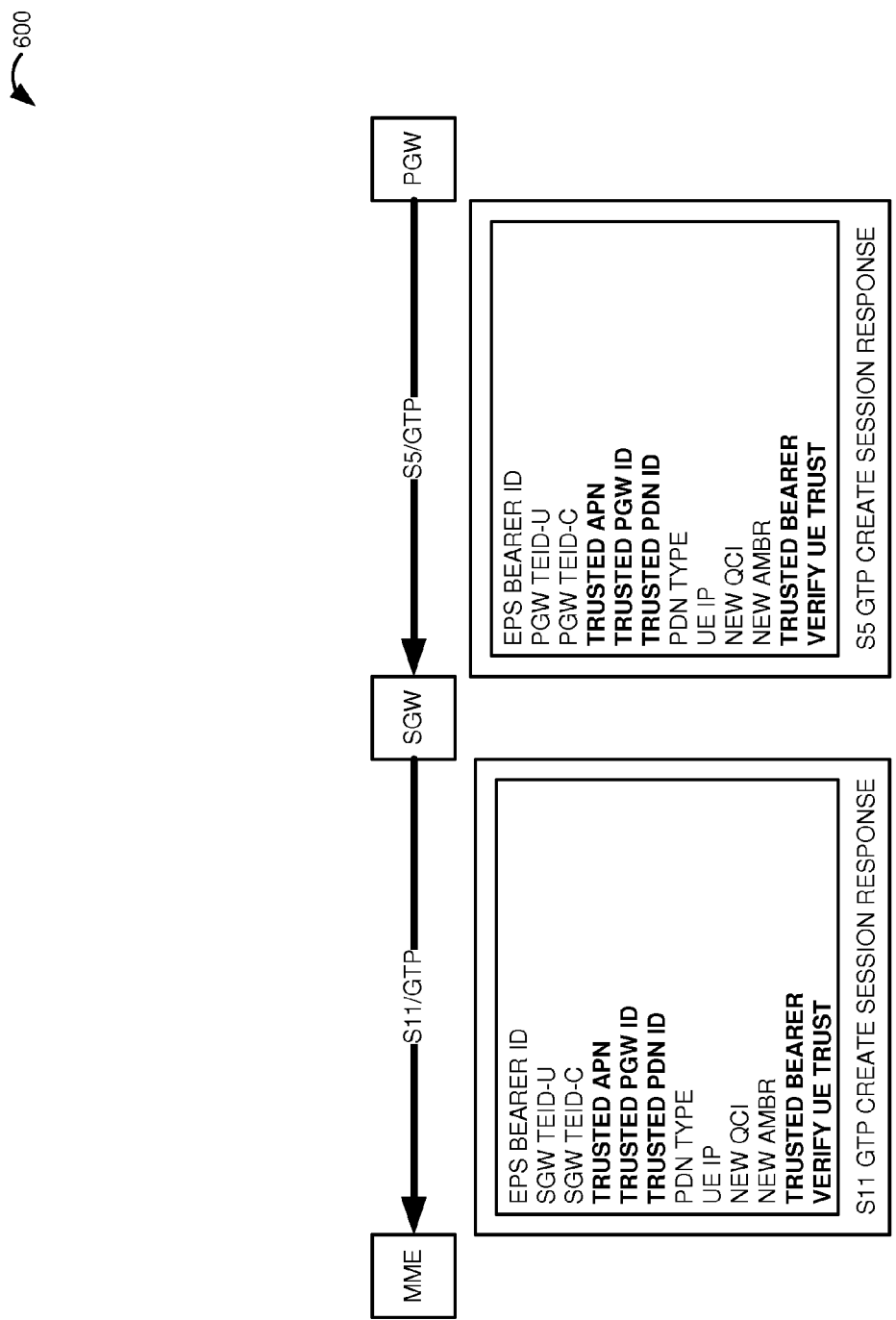

Referring to FIG. 10, the P-GW processes the Diameter IP-CAN response to generate an S5 GTP create session response. The S5 GTP create session response indicates the EPS bearer ID, P-GW TEID-U, P-GW TEID-C, trusted APN, trusted P-GW ID, trusted PDN ID, PDN type, UE IP, new QCI, and new AMBR. The S5 GTP create session request includes the trusted bearer requirement, although this requirement may be indicated through the trusted APN, P-GW ID, and PDN ID. The S5 GTP create session request indicates the requirement to verify hardware trust on the UE. The P-GW transfers the S5 GTP create session response to the S-GW.

The S-GW processes the S5 GTP create session response to generate an S11 GTP create session response. The S11 GTP create session response indicates the EPS bearer ID, S-GW TEID-U, S-GW TEID-C, trusted APN, trusted P-GW ID, trusted PDN ID, PDN type, UE IP, new QCI, and new AMBR. The S11 GTP create session request also includes the trusted bearer requirement, although this requirement may be indicated through the trusted APN, P-GW ID, and PDN ID. The S11 GTP create session request indicates the requirement to verify hardware trust on the UE. The S-GW transfers the S11 GTP create session response to the MME.

Figure 11:
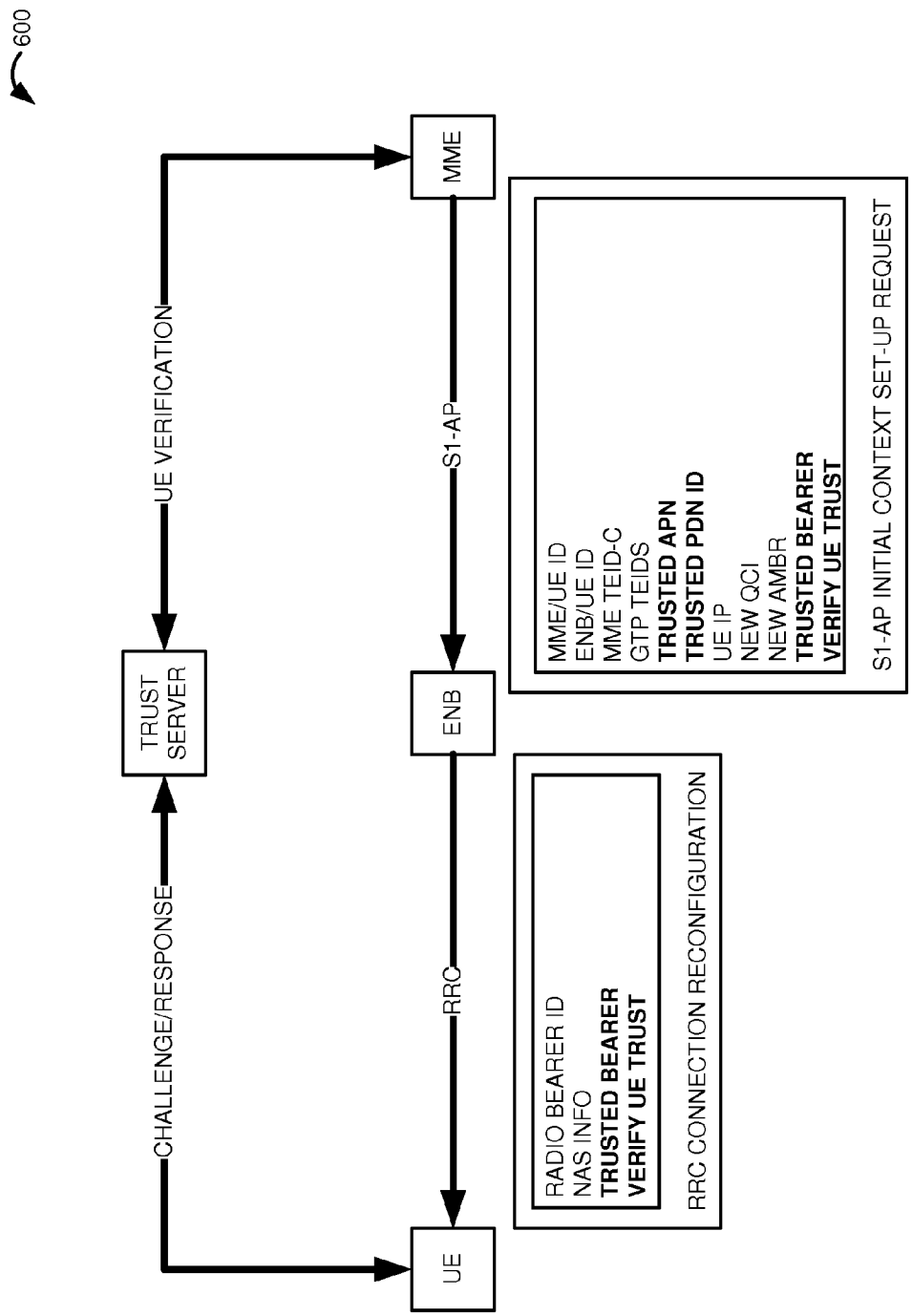

Referring to FIG. 11, the MME processes the S11 GTP create session response to generate an S1-AP initial context set-up request. The S1-AP initial context set-up request indicates S1-AP IDs for the MME, eNodeB, and UE. The S1-AP initial context set-up request indicates the TEID for the control plane. The S1-AP initial context set-up request also has the trusted APN, trusted PDN ID, UE IP, new QCI, new AMBR, and the trusted bearer requirement, although this requirement may be indicated through the trusted APN and trusted PDN ID. The S1-AP initial context set-up request indicates the requirement to verify hardware trust on the UE—although this could be transferred in the NAS response from the MME to the eNodeB. The MME transfers the S1-AP initial context set-up request to the eNodeB.

The eNodeB processes the S1-AP initial context set-up request to generate an RRC connection reconfiguration message. The RRC connection reconfiguration message indicates the radio bearer and NAS information. The RRC connection reconfiguration message indicates the trusted bearer requirement. The RRC connection reconfiguration message also indicates the requirement to verify hardware trust on the UE—possibly in the NAS information.

Although not shown for clarity, additional messaging is transferred between the UE, eNodeB, and MME before the MME transfers S11 modify bearer signaling to the S-GW which transfers S5/S8 modify bearer signaling to the P-GW. In response, the eNodeB, S-GW, and P-GW exchange user data between the UE and other communication nodes over trusted hardware.

Responsive to the PCRF trust order, the MME transfers the requirement to verify hardware trust of the UE to the trust server. In response, the trust server transfers a random number challenge to the UE, and the UE returns a hash result based on the random number and its shared secret key. The trust server verifies the hash result using the random number and its own version of the shared secret key. The random number and hash result may be exchanged with the UE for the trust server through the MME and NAS messaging. The trust server reports the successful verification of the hardware trust for the UE to the MME.

In some examples, the trust server and UE communicate through the eNodeB, S-GW, and P-GW over the trusted bearer responsive to NAS data from the MME. The MME and P-GW may block external data communications for the UE until successful hardware validation is completed by the trust server on the UE. Alternatively, the hardware validation of the UE may be contemporaneous with the use of the trusted bearer, and an alarm could indicate an untrusted UE. Other end-point UEs and access networks may be operated in a like manner and federated to form end-to-end LTE bearers on-demand that are trusted at the hardware layer.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) communication network to transfer data communications for User Equipment (UE), the method comprising:
   in a hardware-trusted Packet Data Network Gateway (P-GW), exchanging hardware trust data with a trusted server system to maintain hardware trust for the hardware-trusted P-GW, wherein another P-GW does not maintain hardware trust with the trusted server system;
   in a Mobility Management Entity (MME), processing a first S1-AP initial UE message that contains a UE Identifier (ID) and a trusted bearer requirement for the UE and responsively transferring the UE ID and the trusted bearer requirement to a Home Subscriber System (HSS);
   in the HSS, processing the UE ID and the trusted bearer requirement to identify and transfer a hardware-trusted Access Point Name (APN) for the UE;
   in the MME, processing the hardware-trusted APN for the UE to select the hardware-trusted P-GW for the UE and responsively generating and transferring a first General Packet Radio Service Transfer Protocol (GTP) create session message for the UE; and
   in the hardware-trusted P-GW, exchanging first user data for the UE responsive to the GTP create session message.

2. The method of claim 1 further comprising:
   in the MME, processing a second S1-AP initial UE message that contains the UE ID but not the trusted bearer requirement and responsively transferring the UE ID without the trusted bearer requirement to the HSS;
   in the HSS, processing the UE ID without the trusted bearer requirement to identify and transfer another APN for the UE;
   in the MME, processing the other APN for the UE to select the other P-GW for the UE and responsively generating and transferring a second GTP create session message for the UE; and
   in the other P-GW, exchanging second user data for the UE responsive to the second GTP create session message.

3. The method of claim 1 further comprising, in an eNodeB, receiving and processing a Radio Resource Control (RRC) message that contains the UE ID and the trusted bearer requirement for the UE and responsively generating and transferring the first S1-AP initial UE message that contains a UE ID and the trusted bearer requirement for the UE.

4. The method of claim 1 further comprising, in an eNodeB, receiving and processing a Radio Resource Control (RRC) Establishment Cause that contains the trusted bearer requirement for the UE and responsively generating and transferring the first S1-AP initial UE message that contains the trusted bearer requirement for the UE.

5. The method of claim 1 wherein processing the first S1-AP initial UE message that contains the UE ID and the trusted bearer requirement for the UE comprises, in the MME, processing a Non-Access Stratum (NAS) message from the UE that contains the UE ID and the trusted bearer requirement for the UE.

6. The method of claim 1 wherein the first GTP create session message comprises an S11 GTP create session message that contains the hardware-trusted APN for the UE.

7. The method of claim 6 wherein exchanging first user data for the UE responsive to the first GTP create session message comprises:
   in a Serving Gateway (S-GW), processing the S11 GTP create session message to generate an S5 GTP create session message that contains the hardware-trusted APN for the UE; and
   in the hardware-trusted P-GW, processing the S5 GTP create session message that contains the hardware-trusted APN for the UE.

8. The method of claim 7 wherein exchanging first user data for the UE responsive to the first GTP create session message comprises:
   in the hardware trusted P-GW, transferring the UE ID and the trusted APN for the UE;
   in a Policy Control and Rules Function (PCRF), processing the UE ID and the trusted APN to select and transfer a trusted Quality-of-Service Class Indicator (QCI) for a trusted bearer for the UE;
   in the hardware trusted P-GW, exchanging the first user data for the UE over the trusted bearer using the trusted QCI.

9. The method of claim 8 further comprising:
   in an LTE access node, exchanging additional hardware trust data with the trusted server system to maintain remote hardware trust for a trusted hardware partition of the LTE access node;
   in the LTE access node, exchanging the first user data through the trusted hardware partition of the LTE access node responsive to the trusted QCI.

10. The method of claim 9 further comprising:
    in the S-GW, exchanging additional hardware trust data with the trusted server system to maintain remote hardware trust for a trusted hardware partition of the S-GW;
    in the S-GW, exchanging the first user data through the trusted hardware partition of the S-GW responsive to the trusted QCI.

11. A Long Term Evolution (LTE) communication network to transfer data communications for User Equipment (UE), the LTE communication network comprising:
    a hardware-trusted Packet Data Network Gateway (P-GW) configured to exchange hardware trust data with a trusted server system to maintain hardware trust for the hardware-trusted P-GW, wherein another P-GW does not maintain hardware trust with the trusted server system;
    a Mobility Management Entity (MME) configured to process a first S1-AP initial UE message that contains a UE Identifier (ID) and a trusted bearer requirement for the UE and responsively transfer the UE ID and the trusted bearer requirement to a Home Subscriber System (HSS);

the HSS configured to process the UE ID and the trusted bearer requirement to identify and transfer a hardware-trusted Access Point Name (APN) for the UE;

the MME configured to process the hardware-trusted APN for the UE to select the hardware-trusted P-GW for the UE and responsively generate and transfer a first General Packet Radio Service Transfer Protocol (GTP) create session message for the UE; and the hardware-trusted P-GW configured to exchange first user data for the UE responsive to the GTP create session message.

12. The LTE communication network of claim 11 further comprising:

the MME configured to process a second S1-AP initial UE message that contains the UE ID but not the trusted bearer requirement and responsively transfer the UE ID without the trusted bearer requirement to the HSS;

the HSS configured to process the UE ID without the trusted bearer requirement to identify and transfer another APN for the UE;

the MME configured to process the other APN for the UE to select the other P-GW for the UE and responsively generate and transfer a second GTP create session message for the UE; and the other P-GW configured to exchange second user data for the UE responsive to the second GTP create session message.

13. The LTE communication network of claim 11 further comprising an eNodeB configured to receive and process a Radio Resource Control (RRC) message that contains the UE ID and the trusted bearer requirement for the UE to responsively generate and transfer the first S1-AP initial UE message that contains a UE ID and the trusted bearer requirement for the UE.

14. The LTE communication network of claim 11 further comprising an eNodeB configured to receive and process a Radio Resource Control (RRC) Establishment Cause that contains the trusted bearer requirement for the UE to responsively generate and transfer the first S1-AP initial UE message that contains the trusted bearer requirement for the UE.

15. The LTE communication network of claim 11 wherein the MME is configured to process a Non-Access Stratum (NAS) message from the UE that contains the UE ID and the trusted bearer requirement for the UE.

16. The LTE communication network of claim 11 wherein the first GTP create session message comprises an S11 GTP create session message that contains the hardware-trusted APN for the UE.

17. The LTE communication network of claim 16 comprising:

a Serving Gateway (S-GW) configured to process the S11 GTP create session message to generate an S5 GTP create session message that contains the hardware-trusted APN for the UE; and the hardware-trusted P-GW is configured to process the S5 GTP create session message that contains the hardware-trusted APN for the UE.

18. The LTE communication network of claim 17 wherein:

the hardware trusted P-GW is configured to transfer the UE ID and the trusted APN for the UE; and further comprising a Policy Control and Rules Function (PCRF) configured to process the UE ID and the trusted APN to select and transfer a trusted Quality-of-Service Class Indicator (QCI) for a trusted bearer for the UE; and wherein the hardware trusted P-GW is configured to exchange the first user data for the UE over the trusted bearer using the trusted QCI.

19. The LTE communication network of claim 18 further comprising an LTE access node configured to exchange additional hardware trust data with the trusted server system to maintain remote hardware trust for a trusted hardware partition of the LTE access node and to exchange the first user data through the trusted hardware partition of the LTE access node responsive to the trusted QCI.

20. The LTE communication network of claim 19 wherein the S-GW is configured to exchange additional hardware trust data with the trusted server system to maintain remote hardware trust for a trusted hardware partition of the S-GW and to exchange the first user data through the trusted hardware partition of the S-GW responsive to the trusted QCI.

* * * * *